(12) United States Patent
Nishiura

(10) Patent No.: US 12,184,714 B2
(45) Date of Patent: Dec. 31, 2024

(54) CONTENT DELIVERY SYSTEM, CONTENT DELIVERY METHOD, AND RECORDING MEDIUM RECORDING CONTENT DELIVERY PROGRAM

(71) Applicant: SHARP KABUSHIKI KAISHA, Sakai (JP)

(72) Inventor: Kazuo Nishiura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 299 days.

(21) Appl. No.: 17/670,835

(22) Filed: Feb. 14, 2022

(65) Prior Publication Data

US 2022/0286492 A1  Sep. 8, 2022

(30) Foreign Application Priority Data

Mar. 4, 2021 (JP) .................................. 2021-034034

(51) Int. Cl.
H04L 65/75 (2022.01)
(52) U.S. Cl.
CPC .................... *H04L 65/75* (2022.05)
(58) Field of Classification Search
CPC ....... H04L 65/75; H04L 65/612; H04L 65/60; H04L 65/601; G06Q 30/0242
See application file for complete search history.

(56) References Cited

U.S. PATENT DOCUMENTS

| 2011/0231514 | A1* | 9/2011 | Ohya | G09B 5/00 709/217 |
| 2011/0289184 | A1* | 11/2011 | Wolinsky | G06Q 30/0277 709/217 |
| 2014/0172601 | A1* | 6/2014 | Beddow | G06Q 20/18 705/21 |
| 2014/0201632 | A1* | 7/2014 | Kunigita | H04N 21/4788 715/716 |
| 2016/0261676 | A1* | 9/2016 | Nishimoto | H04L 67/06 |
| 2018/0107953 | A1 | 4/2018 | Lu | |
| 2018/0121950 | A1* | 5/2018 | Zilkha | G06Q 30/0257 |
| 2021/0105244 | A1* | 4/2021 | O'Rourke | G06F 9/542 |

FOREIGN PATENT DOCUMENTS

CN  110751502 A  * 2/2020
JP  2018-530827 A  10/2018

* cited by examiner

*Primary Examiner* — Tonia L Dollinger
*Assistant Examiner* — Mehulkumar J Shah
(74) *Attorney, Agent, or Firm* — ScienBiziP, P.C.

(57) ABSTRACT

A content delivery system includes: a code generator that generates an information code associating identification information of a content with identification information of a display device playing the content; a content player that causes the display device to display the content and the information code; an information reader that reads the identification information of the content and the identification information of the display device from the information code displayed on the display device; a post processor that posts, to a message management server, post data including the identification information of the content and the identification information of the display device read by the information reader; and an effect measurement device that measures an effect of the content on the basis of information on the post data.

5 Claims, 11 Drawing Sheets

| START TIME | CONTENT ID |
|---|---|
| 09:00:00 | 10000001 |
| 09:00:15 | 10000002 |
| 09:00:30 | 10000003 |
| 09:00:45 | 10000004 |
| 09:01:00 | 10000001 |
| 09:01:15 | 10000002 |
| ... | ... |

| REQUESTED DATE AND TIME | REQUESTED CONTENT ID | DISPLAY DEVICE ID | REQUEST USER | REPOST LEVEL | POST COMMENT |
|---|---|---|---|---|---|
| 2020/05/10 09:30:12 | 10000002 | SQUARE 2 | B | 2 | "WHAT'S THIS!?" |
| ... | ... | ... | ... | ... | ... |

| POSTED DATE AND TIME | POST USER | POST COMMENT | REPOST LEVEL | CONTENT ID | DISPLAY DEVICE ID |
|---|---|---|---|---|---|
| 2020/05/10 09:28:32 | B | " ***** " | 0 | – | – |
| 2020/05/10 09:00:28 | B | " ***** " | 0 | – | – |
| 2020/05/10 07:55:12 | A | "WHAT'S THIS!?" | 2 | 10000002 | SQUARE 2 |
| 2020/05/09 22:31:52 | B | " ***** " | 0 | – | – |
| 2020/05/09 20:23:36 | C | " ***** " | 0 | – | – |
| ... | ... | ... | ... | ... | ... |

| CONTENT ID | SQUARE 1 | SQUARE 2 | SQUARE 3 | ... |
|---|---|---|---|---|
| 10000001 | 5 | 0 | 0 | ... |
| 10000002 | 1 | 14 | 1 | ... |
| 10000003 | 1 | 3 | 10 | ... |
| 10000004 | 0 | 5 | 1 | ... |

| CATEGORY | CONTENT ID | SQUARE 1 | SQUARE 2 | SQUARE 3 | ... |
|---|---|---|---|---|---|
| FOOD | 10000002 10000004 | 1 | 19 | 2 | ... |
| RESTAURANT | 10000001 | 5 | 0 | 0 | ... |
| MOVIE | 10000003 | 1 | 3 | 10 | ... |

CONTENT DELIVERY SYSTEM, CONTENT DELIVERY METHOD, AND RECORDING MEDIUM RECORDING CONTENT DELIVERY PROGRAM

INCORPORATION BY REFERENCE

This application is based upon and claims the benefit of priority from the corresponding Japanese Patent Application No. 2021-034034 filed on Mar. 4, 2021, the entire contents of which are incorporated herein by reference.

BACKGROUND

The present disclosure relates to a content delivery system that delivers a content, a content delivery method, and a recording medium that records a content delivery program.

Conventionally, a content delivery system that plays a content such as an advertisement on a digital signage display (a display device) in a public facility or the like has been proposed. For example, the following system is proposed. The system calculates a transmission evaluation value of each user on the basis of a transfer probability of a user account, selects the account, to which the content is delivered, on the basis of the transmission evaluation value, and delivers the content to the user with the high transmission evaluation value.

Here, the following method for improving advertisement delivery accuracy is used as a method for evaluating an effect of an advertising content. For example, in the method, in the case where the advertising content is delivered to a user terminal in a network, the delivery destination user account is selected according to a rate of clicking the delivered content, a probability that the user purchases an advertised product after clicking, and the like. However, in the case where the delivery destination of the advertising content is the digital signage display, it is difficult to identify a user who has seen the advertisement or to determine that the user has purchased the advertised product. Thus, it is difficult to accurately measure the effect of the advertisement.

SUMMARY

An object of the present disclosure is to provide a content delivery system capable of improving measurement accuracy of an advertising effect of a content that is displayed on a digital signage display, a content delivery method, and a recording medium that records a content delivery program.

A content delivery system according to an aspect of the present disclosure is a content delivery system that plays a content on a display device installed at a predetermined location in a predetermined play schedule, and includes: a code generator that generates an information code associating identification information of the content with identification information of the display device playing the content; a content player that causes the display device to display the content and the information code; an information reader that reads the identification information of the content and the identification information of the display device from the information code displayed on the display device; a post processor that posts, to a message management server, post data including the identification information of the content and the identification information of the display device read by the information reader; and an effect measurement device that measures an effect of the content on the basis of information on the post data.

A content delivery method according to another aspect of the present disclosure is a content delivery method for playing a content on a display device installed at a predetermined location in a predetermined play schedule, and causes one or plural processors to: generate an information code that associates identification information of the content with identification information of the display device playing the content; cause the display device to display the content and the information code; read the identification information of the content and the identification information of the display device from the information code displayed on the display device; post, to a message management server, post data including the identification information of the content and the identification information of the display device that have been read; and measure an effect of the content on the basis of information on the post data.

A recording medium according to further another aspect of the present disclosure is a recording medium that records a content delivery program playing plural contents on a display device installed at a predetermined location in a predetermined play schedule, and causes one or plural processors to: generate an information code that associates identification information of the content with identification information of the display device playing the content; cause the display device to display the content and the information code; read the identification information of the content and the identification information of the display device from the information code displayed on the display device; post, to a message management server, post data including the identification information of the content and the identification information of the display device that have been read; and measure an effect of the content on the basis of information on the post data.

According to the present disclosure, it is possible to improve measurement accuracy of an advertising effect of the content that is displayed on a digital signage display.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table illustrating an example of playlist information that is stored in a content delivery server according to the embodiment of the present disclosure.

FIG. 4 is a table illustrating an example of log information that is stored in the content delivery server according to the embodiment of the present disclosure.

FIG. 5 is a table illustrating an example of post information that is stored in an SNS server according to the embodiment of the present disclosure.

FIG. 11 is a table illustrating an example of aggregate information that is stored in the content delivery server according to the embodiment of the present disclosure.

FIG. 12 is a table illustrating an example of the aggregate information that is stored in the content delivery server according to the embodiment of the present disclosure.

DETAILED DESCRIPTION

A description will hereinafter be made on an embodiment of the present disclosure with reference to the accompanying drawings. The following embodiment is an example in which the present disclosure is embodied, and does not intend to limit the technical scope of the present disclosure.

A content delivery system 100 according to the present embodiment is a system that plays plural contents on a display device (a digital signage display) installed at a predetermined location in a specified play schedule (playlist). For example, the content delivery system 100 is applied to a system that displays (plays) a content (signage information) including a video and sound, such as an advertisement, in any of various locations such as a public square, a station, a street, a business facility, and a store. In the present embodiment, a description will be made on a case where the content delivery system 100 is applied to the public square as an example.

Figure 1:
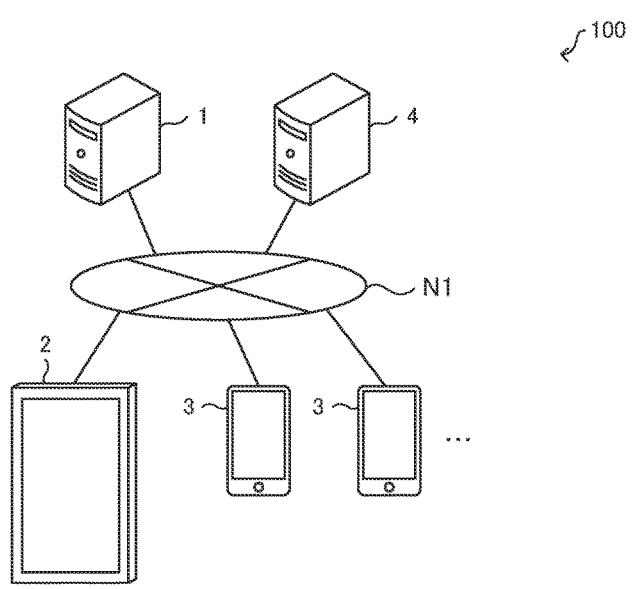
FIG. 1 is a schematic view illustrating a schematic configuration of a content delivery system according to an embodiment of the present disclosure.

FIG. 1 is a view illustrating a schematic configuration of the content delivery system 100 according to the embodiment of the present disclosure. The content delivery system 100 includes a content delivery server 1, a display device 2, a user terminal 3, and a social network service (SNS) server 4. The content delivery server 1, the display device 2, the user terminal 3, and the SNS server 4 are communicably connected via a network N1. The network N1 is a communication network such as the Internet. The SNS server 4 is an example of the message management server in the present disclosure.

The content delivery system 100 may include the plural display devices 2 and the plural user terminals 3. The content delivery server 1 manages the plural display devices 2, each of which is installed in a different location. The user terminal 3 is a terminal such as a smartphone that is owned by a user who visits the location (the square) where the display device 2 is installed.

The SNS server 4 is a server device that provides a social networking service (an SNS service) to share various types of information (an image, sound a comment, and the like) posted from the user terminal 3 in a predetermined group (network) for communication.

For example, a user A uses the user terminal 3 to acquire information on the content currently played on the display device 2, which plays the content delivered from the content delivery server 1, in a square 2 and post the content information to the SNS. The SNS server 4 sends the content information that has been posted to the SNS to a user terminal 3A of the user A and a user terminal 3B of a user B (a follower of the user A) who is in the same group as the user A. When acquiring the content information, the user B makes a content delivery request to the content delivery server 1. In this way, the user B can play the content on the user terminal 3B. The content delivery system 100 measures an advertising effect of the content on the basis of log information such as posting and playing of the content by the user.

A description will hereinafter be made on a specific configuration of the content delivery system 100.

Content Delivery Server 1

Figure 2:
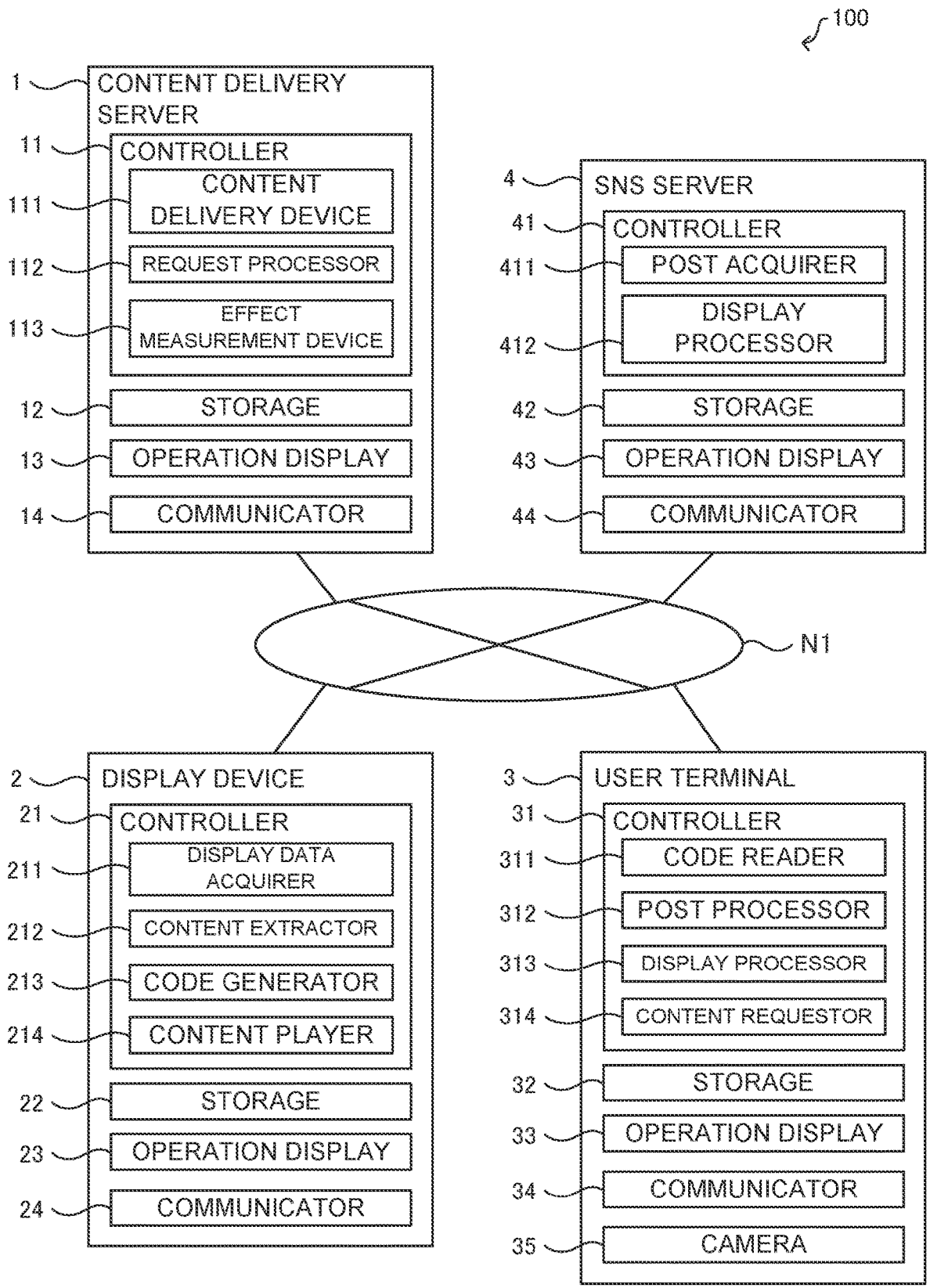
FIG. 2 is a block diagram illustrating the configuration of the content delivery system according to the embodiment of the present disclosure.

As illustrated in FIG. 2, the content delivery server 1 is a server computer that includes a controller 11, a storage 12, an operation display 13, a communicator 14, and the like. The content delivery server 1 is not limited to a single computer, but may be a computer system in which plural computers operate cooperatively. In addition, various types of processing executed by the content delivery server 1 may separately be executed by one or plural processors.

The communicator 14 is a communication interface that connects the content delivery server 1 to the network N1 in a wired or wireless manner and that executes data communication with the display device 2, the user terminal 3, and the SNS server 4 via the network N1 according to a predetermined communication protocol.

The operation display 13 is a user interface that includes: a display, such as a liquid-crystal display or an organic EL display, that displays various types of information; and an operation device, such as a mouse, a keyboard, or a touch panel, that accepts operations. The operation display 13 accepts the operation by an administrator of the content delivery server 1, for example.

The storage 12 is a non-volatile storage, such as a hard disk drive (HDD), a solid state drive (SSD), or flash memory, that stores the various types of the information. The storage 12 stores control programs such as a content delivery program that causes the controller 11 to execute content delivery processing (see FIG. 15), which will be described below. For example, the content delivery program is recorded non-temporarily in a computer-readable recording medium such as a CD or a DVD, is read by a reader (not illustrated) such as a CD drive or a DVD drive provided in the content delivery server 1, and is stored in the storage 12. Alternatively, the content delivery program may be delivered from a cloud server and stored in the storage 12.

The storage 12 also stores various types of information on the content in addition to content data. More specifically, the storage 12 stores data such as playlist information D1 on a play schedule of the content and log information D2 on the content delivery request.

FIG. 3 is a table illustrating an example of the playlist information D1. The playlist information D1 includes identification information (content IDs) of plural contents to be played on the display device 2 and time (start time) at which each of the contents is played. FIG. 3 illustrates the playlist information D1 that corresponds to the display device 2 installed in the "SQUARE 2". The playlist information D1 is stored for each of the display devices 2 in the storage 12. The controller 11 (a content delivery device 111) delivers, to the display device 2, display data that includes the playlist information D1 and the content data.

FIG. 4 is a table illustrating an example of the log information D2. The log information D2 includes information (access information) on the content in a case where, on the user terminal 3, the user requests delivery of the content. More specifically, the log information D2 includes information such as a requested date and time, a requested content ID, a display device ID, a request user, a repost level, and a post comment. For example, in the case where, in the above-described example, the content posted by the user A is displayed in a timeline of the user terminal 3B of the user B, the user B requests delivery of the content. The requested date and time is a date and time when the user B requests the delivery of the content. The requested content ID is the identification information of the content requested by the user B. The display device ID is identification information (installation location information) of the display device 2 that has played the content. In the above-described example, as the display device ID, the "SQUARE 2" is registered as the identification information of the display device 2 in the square 2. The request user is the user (the user B herein) who has requested the content. The repost level is information on a post frequency of a case where the acquired content is posted (reposted) to the SNS again. Every time the same content is posted again, the repost level corresponding to the content is increased. The post comment is information on a comment that the user A has entered on the user terminal 3A at the time of posting the content, which has been played on the display device 2, to the SNS.

The controller 11 stores the log information D2 every time the controller 11 acquires the content delivery request from each of the plural user terminals 3. The log information D2 is used to measure the effect of delivery of the content.

As another embodiment, the content data, the playlist information D1, and the log information D2 may partially or entirely be stored in another server that can be accessed from the content delivery server 1. In this case, the controller 11 in the content delivery server 1 may acquire the information from the other server and execute each of the processing such as the content delivery processing (see FIG. 15), which will be described below.

The controller 11 includes control devices such as a CPU, ROM, and RAM. The CPU is a processor that executes various types of arithmetic processing. The ROM is a non-volatile storage that stores, in advance, control programs such as a BIOS and an OS for causing the CPU to execute various types of processing. The RAM is a volatile or non-volatile storage that stores various types of information, and is used as temporary storage memory (a working area) for the various types of processing executed by the CPU. The controller 11 controls the content delivery server 1 when the CPU executes the various control programs, which are stored in the ROM or the storage 12 in advance.

More specifically, the controller 11 includes various processing devices such as the content delivery device 111, a request processor 112, and an effect measurement device 113. The controller 11 functions as the various processing devices by executing various types of processing according to the content delivery program. Some or all of the processing devices included in the controller 11 may be constructed of an electronic circuit. The content delivery program may be a program that makes plural processors function as the various processing devices.

The content delivery device 111 delivers the content to the display device 2. More specifically, the content delivery device 111 sends, to the display device 2, the display data that includes the playlist information D1 (see FIG. 3) corresponding to the display device 2 and the content data. When acquiring the display data from the content delivery server 1, the display device 2 plays the content on the basis of the playlist information D1.

The request processor 112 acquires the content delivery request (which will be described below) from the user terminal 3. When acquiring the delivery request, the request processor 112 sends the corresponding content data to the user terminal 3 as a source of the delivery request. When acquiring the content data from the content delivery server 1, the user terminal 3 plays the content on an operation display 33 of the own terminal. In addition, when acquiring the delivery request, the request processor 112 stores the log information D2 (see FIG. 4).

The effect measurement device 113 measures the advertising effect of the delivery of the content on the basis of information on post data. More specifically, the effect measurement device 113 measures the advertising effect of the content on the basis of the log information D2, post information D3 (see FIG. 5) of the SNS server 4, and the like. A specific method for measuring the advertising effect will be described below.

Display Device 2

As illustrated in FIG. 2, the display device 2 includes a controller 21, a storage 22, an operation display 23, a communicator 24, and the like. The display device 2 is a digital signage display.

The communicator 24 is a communication interface that connects the display device 2 to the network N1 in the wired or wireless manner and that executes data communication with the content delivery server 1, the user terminal 3, and the SNS server 4 via the network N1 according to the predetermined communication protocol.

The operation display 23 is a user interface that includes: a display, such as a liquid-crystal display or an organic EL display, that displays various types of information; and an operation device, such as a mouse, a keyboard, or a touch panel, that accepts operations. The operation display 23 plays the content, for example.

The storage 22 is a non-volatile storage, such as a HDD, an SSD, or flash storage, that stores the various types of the information. The storage 22 stores control programs such as a content delivery program that causes the controller 21 to execute the content delivery processing (see FIG. 15), which will be described below. For example, the content delivery program is recorded non-temporarily in a computer-readable recording medium such as a CD or a DVD, is read by a reader (not illustrated) such as a CD drive or a DVD drive provided in the display device 2, and is stored in the storage 22. Alternatively, the content delivery program may be delivered from the cloud server and stored in the storage 22.

The storage 22 also stores data such as the display data (the content data and the playlist information D1) delivered from the content delivery server 1.

The controller 21 includes control devices such as a CPU, ROM, and RAM. The CPU is a processor that executes various types of the arithmetic processing. The ROM is a non-volatile storage that stores, in advance, control programs such as a BIOS and an OS for causing the CPU to execute various types of processing. The RAM is a volatile or non-volatile storage that stores various types of information, and is used as temporary storage memory (a working area) for the various types of processing executed by the CPU. The controller 21 controls the display device 2 when the CPU executes the various control programs, which are stored in the ROM or the storage 22 in advance.

More specifically, the controller 21 includes various processing devices such as a display data acquirer 211, a content extractor 212, a code generator 213, and a content player 214. The controller 21 functions as the various processing devices by executing various types of processing according to the content delivery program. Some or all of the processing devices included in the controller 21 may be constructed of an electronic circuit. The content delivery program may be a program that makes plural processors function as the various processing devices.

The display data acquirer 211 acquires the display data (the content data and the playlist information D1) delivered from the content delivery server 1. The display data acquirer 211 stores the acquired display data in the storage 22.

The content extractor 212 extracts the content from the display data. More specifically, in the case where the display data includes plural pieces of content data with content IDs "10000001", "10000002", "10000003", and "10000004", the content extractor 212 extracts each of the content IDs.

The code generator 213 generates a two-dimensional code that associates the identification information of the content and the identification information of the display device 2. More specifically, the code generator 213 generates a two-dimensional code C that embeds: the content ID extracted by the content extractor 212; and the display device ID of the display device 2 as the own device. The code generator 213 generates the two-dimensional code C per content. For example, the code generator 213 generates: a two-dimensional code C1 that corresponds to a content P1 with the content ID "10000001"; a two-dimensional code C2 that corresponds to a content P2 with the content ID "10000002"; a two-dimensional code C3 that corresponds to a content P3 with the content ID "10000003"; and a two-dimensional code C4 that corresponds to a content P4 with the content ID "10000004". The two-dimensional code is an example of the information code according to the present disclosure. The information code according to the present disclosure is not limited to the two-dimensional code, but only needs to be a medium, such as a one-dimensional code, a marker, or an IC chip, from which predetermined information can be read. The code generator 213 is an example of the code generator according to the present disclosure.

The content player 214 causes the operation display 23 to play the content on the basis of the display data. More specifically, the content player 214 causes the operation display 23 to sequentially play the contents P1 to P4 on the basis of the play schedule in the playlist information D1 (see FIG. 3).

In addition, the content player 214 causes the operation display 23 to display the two-dimensional code C that corresponds to the content to be played. For example, the content player 214 causes the operation display 23 to display the two-dimensional code C1 over the content P1 while the content P1 is played, to display the two-dimensional code C2 over the content P2 while the content P2 is played, to display the two-dimensional code C3 over the content P3 while the content P3 is played, and to display the two-dimensional code C4 over the content P4 while the content P4 is played. The content player 214 is an example of the content player according to the present disclosure.

Figure 6:
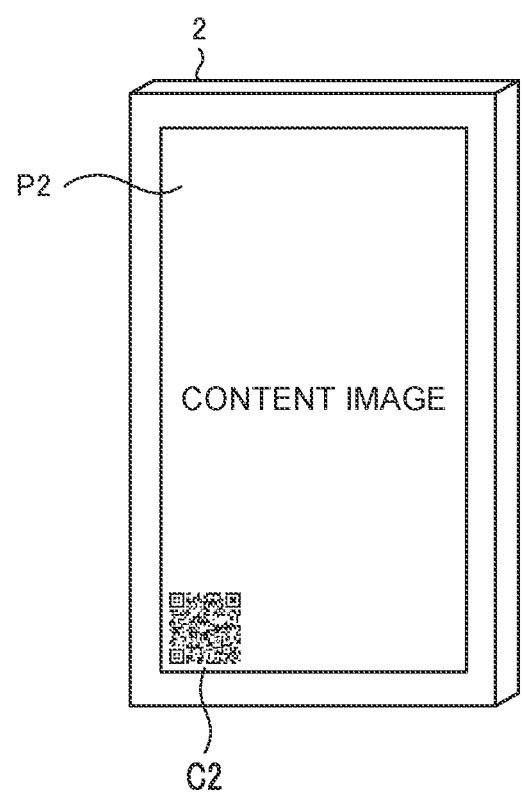
FIG. 6 is a view illustrating an example of a display screen of a display device according to the embodiment of the present disclosure.

FIG. 6 illustrates a state where the content P2 and the two-dimensional code C2 are displayed on the display device 2 in the square 2. The two-dimensional code C2 embeds information on the content ID "10000002" of the content P2 and information on the display device ID "SQUARE 2" of the display device 2.

User Terminal 3

As illustrated in FIG. 2, the user terminal 3 includes a controller 31, a storage 32, the operation display 33, a communicator 34, and the like. The user terminal 3 is an information processor such as a smartphone, a mobile phone, a tablet terminal, or a personal computer.

The communicator 34 is a communication interface that connects the user terminal 3 to the network N1 in the wired or wireless manner and that executes data communication with the content delivery server 1, the display device 2, and the SNS server 4 via the network N1 according to the predetermined communication protocol.

The operation display 33 is a user interface that includes: a display, such as a liquid-crystal display or an organic EL display, that displays information such as various webpages; and an operation device, such as a mouse, a keyboard, or a touch panel, that accepts operations. For example, the operation display 33 displays a screen that is executed by an SNS application. The operation display 33 is constructed of a touch panel, for example, and accepts the user's selection operation (touch operation) on each of various screens and the like.

A camera 35 is a digital camera that captures an image of the two-dimensional code as a subject and outputs the image as digital image data. The image data that is captured by the camera 35 is sent to the controller 31.

The storage 32 is a non-volatile storage, such as a HDD, an SSD, or flash storage, that stores various types of information. For example, the storage 32 stores control programs such as a browser program. More specifically, the browser program is a control program that causes the controller 31 to execute communication processing with an external device such as the content delivery server 1 or the SNS server 4 according to the communication protocol such as Hypertext Transfer Protocol (HTTP). The browser program may be a dedicated application that executes the communication processing with the content delivery server 1 and the SNS server 4 according to the predetermined communication protocol.

The controller 31 has control devices such as a CPU, ROM, and RAM. The CPU is a processor that executes various types of the arithmetic processing. The ROM is a non-volatile storage that stores, in advance, control programs such as a BIOS and an OS for causing the CPU to execute various types of processing. The RAM is a volatile or non-volatile storage that stores the various types of the information, and is used as temporary storage memory (a working area) for the various types of processing executed by the CPU. The controller 31 controls the user terminal 3 when the CPU executes the various control programs, which are stored in the ROM or the storage 32 in advance.

More specifically, the controller 31 includes various processing devices such as a code reader 311, a post processor 312, a display processor 313, and a content requestor 314. The controller 31 functions as the various processing devices by executing the various types of processing according to the control program. Some or all of the processing devices included in the controller 31 may be constructed of an electronic circuit. The control program may be a program that makes the plural processors function as the various processing devices.

Figure 7:
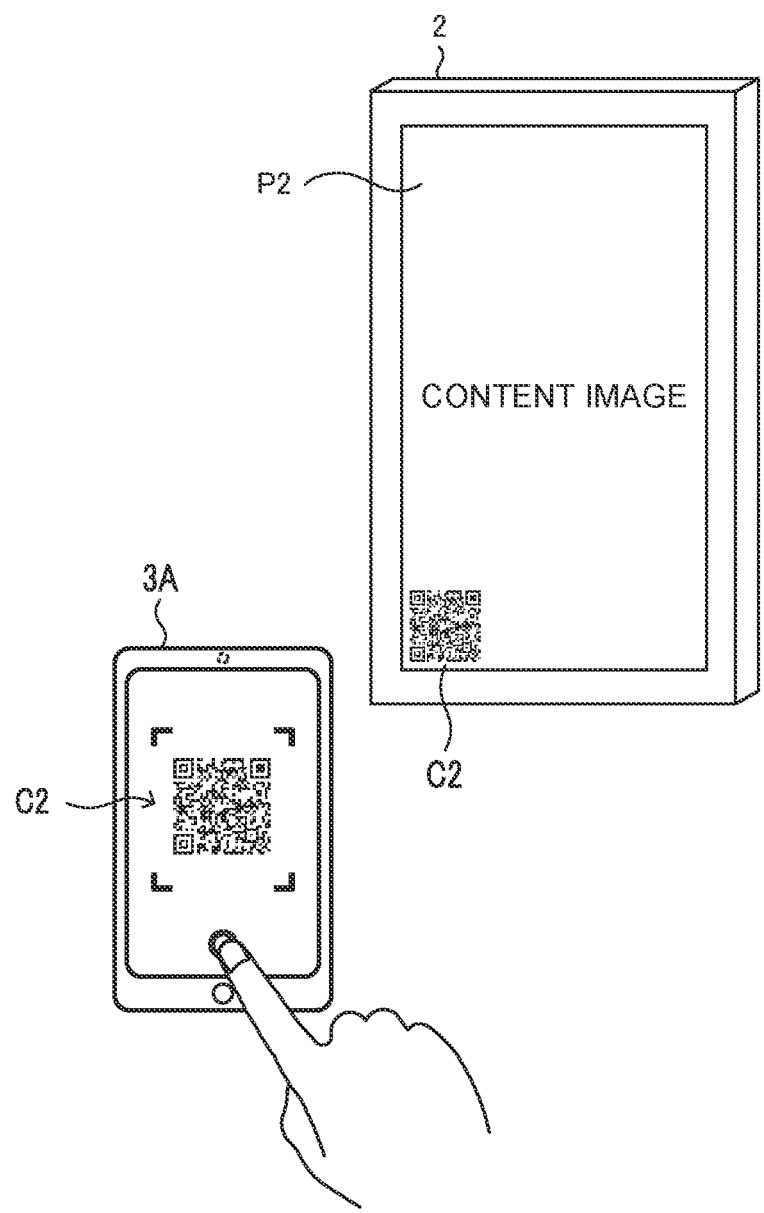
FIG. 7 is a view illustrating an example of a two-dimensional code reading screen of a user terminal according to the embodiment of the present disclosure.

The code reader 311 reads the identification information of the content and the identification information of the display device 2 from the two-dimensional code that is displayed on the display device 2. More specifically, the code reader 311 reads the content ID and the display device ID from the image data of the two-dimensional code C captured by the camera 35. For example, as illustrated in FIG. 7, in the case where the display device 2 in the square 2 displays the content P2 (the content ID "10000002") and the two-dimensional code C2, and where the user A captures an image of the two-dimensional code C2 by using the camera 35 in the user terminal 3A, the code reader 311 reads the content ID "10000002" and the display device ID "SQUARE 2" from the image data of the two-dimensional code C2. The code reader 311 is an example of the information reader according to the present disclosure.

The post processor 312 posts (sends), to the SNS server 4, the post data including the identification information of the content and the identification information of the display device 2, which are read by the code reader 311. For example, when the code reader 311 reads the content ID "10000002" and the display device ID "SQUARE 2" from the image data of the two-dimensional code C2, the post processor 312 causes the operation display 33 to display a post screen (a web page) illustrated in FIG. 8. On the post screen, the content P2, which corresponds to the content ID "10000002", and a comment field are displayed. The user A can enter a desired post comment (a post comment M2) in the comment field. When the user checks the content P2 to be posted, enters the post comment M2, and presses a post button K1, the post processor 312 sends, to the SNS server 4, the post data that includes identification information of a post user (a user ID), the information on the content ID "10000002", the information on the display device ID "SQUARE 2", and information on the post comment M2 "WHAT'S THIS?" The post processor 312 is an example of the post processor according to the present disclosure.

Figure 9:
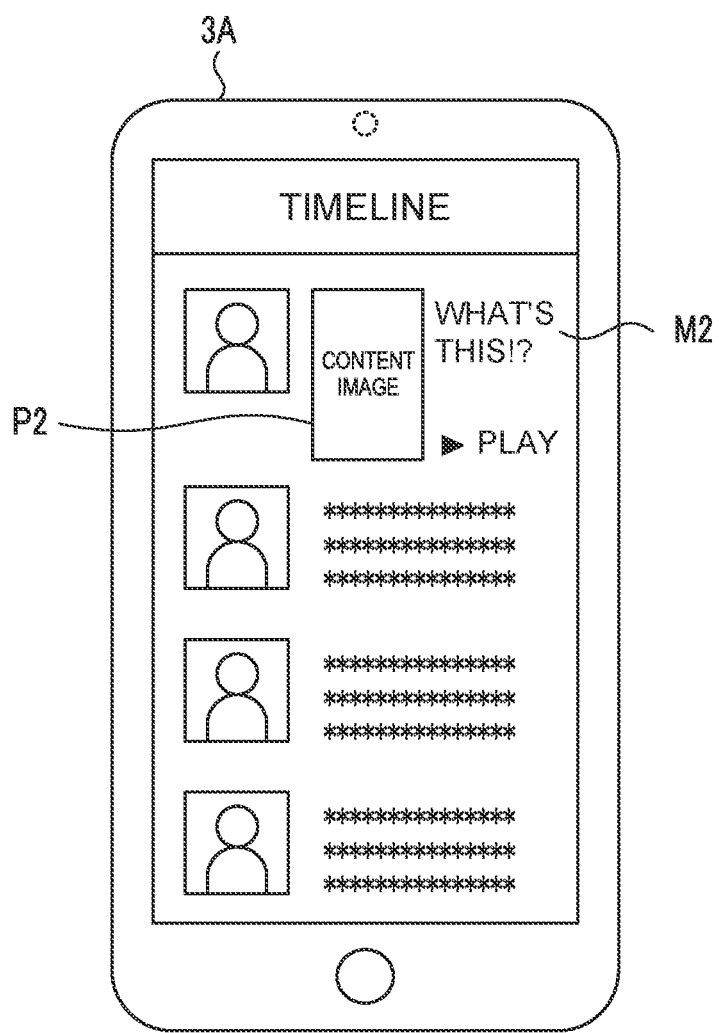
FIG. 9 is a view illustrating an example of the display screen of the user terminal according to the embodiment of the present disclosure.

The display processor 313 causes the operation display 33 to display a display screen by the SNS application. More specifically, when the SNS server 4 acquires the post data from the user terminal 3A of the user A, the SNS server 4 sends, to the user terminal 3A as a post source of the post data, display data in a timeline format in which the posted information is arranged chronologically. When acquiring the display data from the SNS server 4, the display processor 313 in the user terminal 3A causes the operation display 33 to display a display screen, which is illustrated in FIG. 9.

Figure 10:
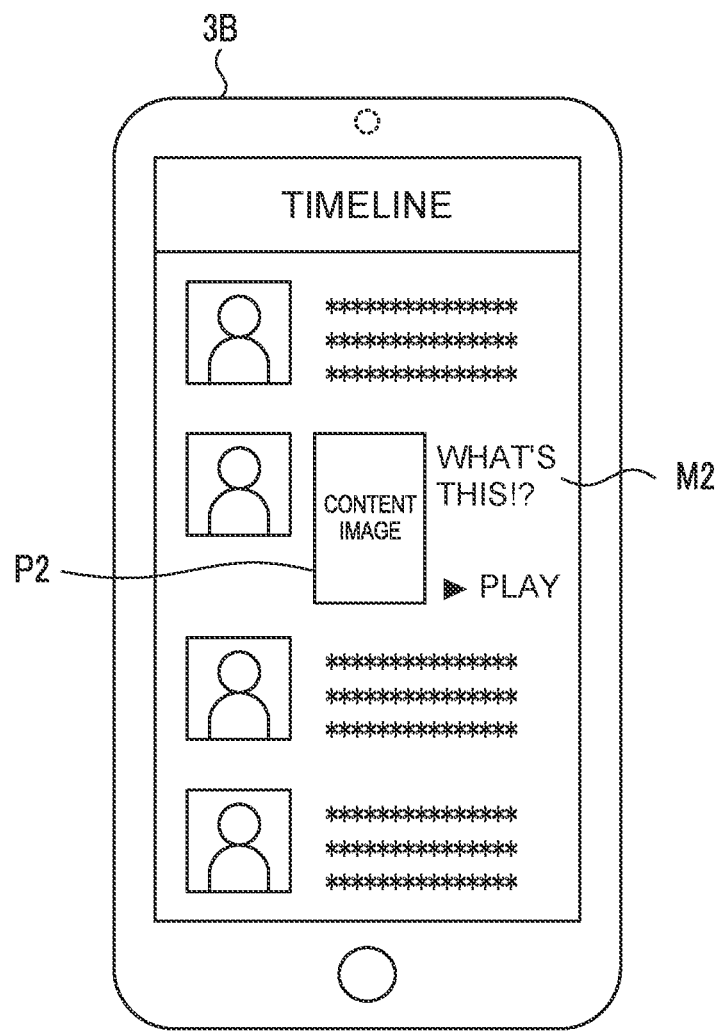
FIG. 10 is a view illustrating an example of the display screen of the user terminal according to the embodiment of the present disclosure.

When acquiring the post data from the user terminal 3A of the user A, the SNS server 4 also sends the display data to the user terminal 3B of the user B (the follower of the user A) who is in the same group as the user A. When acquiring the display data from the SNS server 4, the display processor 313 in the user terminal 3B causes the operation display 33 to display a display screen, which is illustrated in FIG. 10. Just as described, the SNS server 4 sends the display data to each of the user terminals 3 of the followers who follow the post source user of the post data, and causes each of such user terminals 3 to display the display data in the timeline format. In this way, each of the users can acquire the information on the content that is posted by the post user.

The content requestor 314 sends the content delivery request to the content delivery server 1 in response to the user's operation for the content delivery request. For example, when the user B presses a play button for the content P2 on the display screen of the user terminal 3B illustrated in FIG. 10, the content requestor 314 accepts the delivery request operation for the content P2 and sends the delivery request for the content P2 to the content delivery server 1. The delivery request includes the identification information of the request user (the user ID), the information on the content ID "10000002", the information on the display device ID "SQUARE 2", the information on the post comment M2 "WHAT'S THIS?", and the information on the repost level. The content requestor 314 is an example of the content requestor according to the present disclosure.

When acquiring the delivery request from the user terminal 3B of the user B, the content delivery server 1 sends the corresponding content data to the user terminal 3B. Here, the content delivery server 1 sends the content data of the content P2 to the user terminal 3B. When acquiring the content data from the content delivery server 1, the display processor 313 in the user terminal 3 plays the content P2 on the operation display 33 of the own terminal. When acquiring the delivery request, the request processor 112 in the content delivery server 1 stores the log information D2 (see FIG. 4).

In addition, when accepting, from the user, an operation to repost the content that has been played on the user terminal 3, the post processor 312 reposts, to the SNS server 4, the post data that includes the identification information of the content and the identification information of the display device 2. More specifically, the post processor 312 sends the post data to the SNS server 4 according to the user's repost operation. For example, after the content P2 is played on the user terminal 3B, the user enters a desired post comment (for example, "BEAUTIFUL") on the post screen and presses the post button. In such a case, the post processor 312 sends, to the SNS server 4, post data (repost data) that includes the identification information of the post user ("the user B"), the information on the content ID "10000002", the information on the display device ID "SQUARE 2", and information on the post comment M2 "BEAUTIFUL".

SNS Server 4

As illustrated in FIG. 2, the SNS server 4 is a server computer that includes a controller 41, a storage 42, an operation display 43, a communicator 44, and the like. The SNS server 4 is not limited to a single computer, but may be a computer system in which plural computers operate cooperatively. In addition, various types of processing that are executed by the SNS server 4 may separately be executed by one or plural processors.

The communicator 44 is a communication interface that connects the SNS server 4 to the network N1 in the wired or wireless manner and that executes data communication with the content delivery server 1, the display device 2, and the user terminal 3 via the network N1 according to the predetermined communication protocol.

The operation display 43 is a user interface that includes: a display, such as a liquid-crystal display or an organic EL display, that displays various types of information; and an operation device, such as a mouse, a keyboard, or a touch panel, that accepts operations.

The storage 42 is a non-volatile storage, such as a HDD, an SSD, or flash memory, that stores the various types of the information. The storage 42 stores control programs such as an SNS program for causing the controller 41 to execute the SNS application. For example, the SNS program is recorded non-temporarily in a computer-readable recording medium such as a CD or a DVD, is read by a reader (not illustrated) such as a CD drive or a DVD drive provided in the SNS server 4, and is stored in the storage 42. Alternatively, the SNS program may be distributed from the cloud server and stored in the storage 42.

The storage 42 also stores data such as the post information D3 (the post data) that includes the information posted by each of the users.

FIG. 5 is a table illustrating an example of the post information D3. The post information D3 includes information such as a post date and time, the post user, the post comment, the repost level, the content ID, and the display device ID. The post date and time is information on the date and time of posting by the user to the SNS. The post user is the identification information (a name, the user ID, or the like) of the user who has posted to the SNS. The post comment is a content of the post comment M2 that the user has entered on the post screen (see FIG. 8). The repost level is the information on the post frequency of the case where the user reposts the acquired content to the SNS. The content ID is the identification information of the content posted by the user. The display device ID is the identification information (the installation location information) of the display device 2 that has originally displayed the content posted by the user. The controller 41 stores the post information D3 every time the controller 41 acquires the post data via the user terminal 3.

The controller 41 includes control devices such as a CPU, ROM, and RAM. The CPU is a processor that executes various types of the arithmetic processing. The ROM is a non-volatile storage that stores, in advance, control programs such as a BIOS and an OS for causing the CPU to execute various types of processing. The RAM is a volatile or non-volatile storage that stores various types of information, and is used as temporary storage memory (a working area) for the various types of processing executed by the CPU. The controller 41 controls the SNS server 4 when the CPU executes the various control programs, which are stored in the ROM or the storage 42 in advance.

More specifically, the controller 41 includes various processing devices such as a post acquirer 411, a display processor 412, and the like. The controller 41 functions as the various processing devices by executing the various types of processing according to the SNS program. Some or all of the processing devices included in the controller 41 may be constructed of an electronic circuit. The SNS program may be a program that makes the plural processors function as the various processing devices.

The post acquirer 411 acquires the post data posted from the user. For example, in the case where the user A uses the user terminal 3A to acquire the content P2 that is currently played on the display device 2 in the square 2 (see FIG. 7), enter the post comment M2, and post the post comment M2 to the SNS (see FIG. 8), the post acquirer 411 acquires such post data. More specifically, the post acquirer 411 acquires each of the information on the post user ("the user A"), the post comment M2 ("WHAT'S THIS?"), the content ID ("10000002"), and the display device ID ("SQUARE 2").

In addition, for example, when the user B who is the follower of the user A presses the play button (see FIG. 10) for the content P2 displayed in the timeline on the user terminal 3B, the content P2 is played on the user terminal 3B. When the user B enters the post comment M2 and performs the repost operation on the post screen, the post acquirer 411 acquires such post data. More specifically, the post acquirer 411 acquires each of the information on the post user ("the user B"), the post comment M2 ("BEAUTIFUL"), the content ID ("10000002"), and the display device ID ("SQUARE 2").

When acquiring the post data, the post acquirer 411 stores, in the storage 42, the post information D3 (see FIG. 5) that includes the information on the post date and time. In addition, the post acquirer 411 registers the repost level in the post information D3 according to a repost frequency. In this way, the post information D3 is accumulated in the storage 42.

The post acquirer 411 sends the post information D3 to the content delivery server 1. The content delivery server 1 measures the advertising effect of the content on the basis of the post information D3.

The display processor 412 causes each of the user terminals 3 to display the post information on the basis of the post data acquired by the post acquirer 411. For example, when acquiring the post information posted by the user A, the display processor 412 sends the display data corresponding to the post information to the user terminal 3A of the user A and the user terminal 3 of the user (the follower) who is in the same group as the user A, and causes the user terminal 3A of the user A and the user terminal of the user (the follower) who is in the same group as the user A to display the post information in the timeline format (see FIG. 9 and FIG. 10). In this way, the display processor 412 updates the timeline of the post information in the user terminal 3 in real time. The display processor 412 is an example of the display processor according to the present disclosure.

A description will herein be made on an example of a method for measuring the advertising effect of the content by the effect measurement device 113 in the content delivery server 1.

For example, the effect measurement device 113 measures the advertising effect of the content on the basis of the log information D2 (see FIG. 4) of the content, the post information D3 (see FIG. 5) of the content posted to the SNS (see FIG. 8), and the like that are included in the post information (see FIG. 9 and FIG. 10) displayed on the user terminal 3. More specifically, for each of the contents played on the display device 2, the effect measurement device 113 counts the number of the delivery requests (number of plays) for requesting the delivery of the content displayed in the timeline of each of the user terminals 3. FIG. 11 illustrates an example of aggregate information D4 indicating the number of plays per content. FIG. 11 illustrates the number of plays for each of the display devices 2 installed in the different locations (a square 1, the square 2, and a square 3). For example, the effect measurement device 113 presents an aggregate result to a content administrator.

It is understood from the result illustrated in FIG. 11 that the content with the content ID "10000001" has the high advertising effect when played on the display device 2 in the square 1, that the content with the content ID "10000002" has the high advertising effect when played on the display device 2 in the square 2, that the content with content ID "10000003" has the high advertising effect when played on the display device 2 in the square 3, and that the content with the content ID "10000004" has the high advertising effect when played on the display device 2 in the square 2. In this way, the administrator can comprehend the play location with the high advertising effect per content, for example.

As illustrated in aggregate information D5 in FIG. 12, the effect measurement device 113 may aggregate the number of plays per attribute (category) of the content. For example, in the case where both of the contents with the content ID "10000002" and the content ID "10000004" are advertisements related to food, the effect measurement device 113 totals the number of plays of the contents with the content ID "10000002" and the content ID "10000004". In this way, it is possible to comprehend the play location with the high advertising effect per category of the content.

Figure 13:
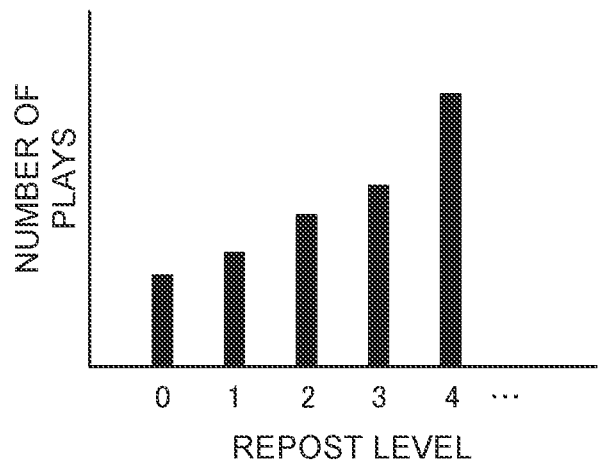
FIG. 13 is a graph illustrating an example of the aggregate information that is stored in the content delivery server according to the embodiment of the present disclosure.
Figure 14:
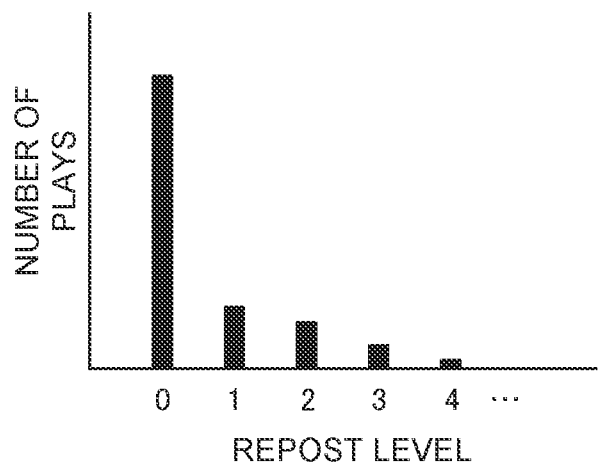
FIG. 14 is a table illustrating an example of the aggregate information that is stored in the content delivery server according to the embodiment of the present disclosure.

The effect measurement device 113 may aggregate the number of plays per repost level. For example, the user posts the content P1 for the first time, the content P1 is displayed in the timeline of each of the user terminals 3, and one or a plurality of the users makes the delivery request for the content P1. In such a case, the effect measurement device 113 aggregates the number of the delivery requests (the number of plays corresponding to the repost level "0"). In addition, in the case where the user reposts the content P1, which has been played on the user terminal 3 in response to the delivery request, and the content P1 is displayed in the timeline of each of the user terminals 3, one or the plurality of the users further makes the delivery request for the content P1. In such a case, the effect measurement device 113 aggregates the number of the delivery requests (the number of plays corresponding to the repost level "1"). In this way, the effect measurement device 113 aggregates the number of plays per repost level. FIG. 13 and FIG. 14 each illustrate an example of the aggregate result per repost level. The effect measurement device 113 measures the effect of the content on the basis of the number of content delivery requests. It is understood from the aggregate result illustrated in FIG. 13 that the number of plays is increased as the number of posts is increased, that is, the more the content is spread. In addition, it is understood from the aggregate result illustrated in FIG. 14 that, although the number of plays is large for the first post, the number of plays is reduced with the increase in the number of post.

As another embodiment, the effect measurement device 113 may measure the advertising effect of the content on the basis of a content of the post comment. For example, the effect measurement device 113 may classify the post comment as a positive word or a negative word, and calculate a total evaluation value per content, and thereby measure the advertising effect.

Figure 8:
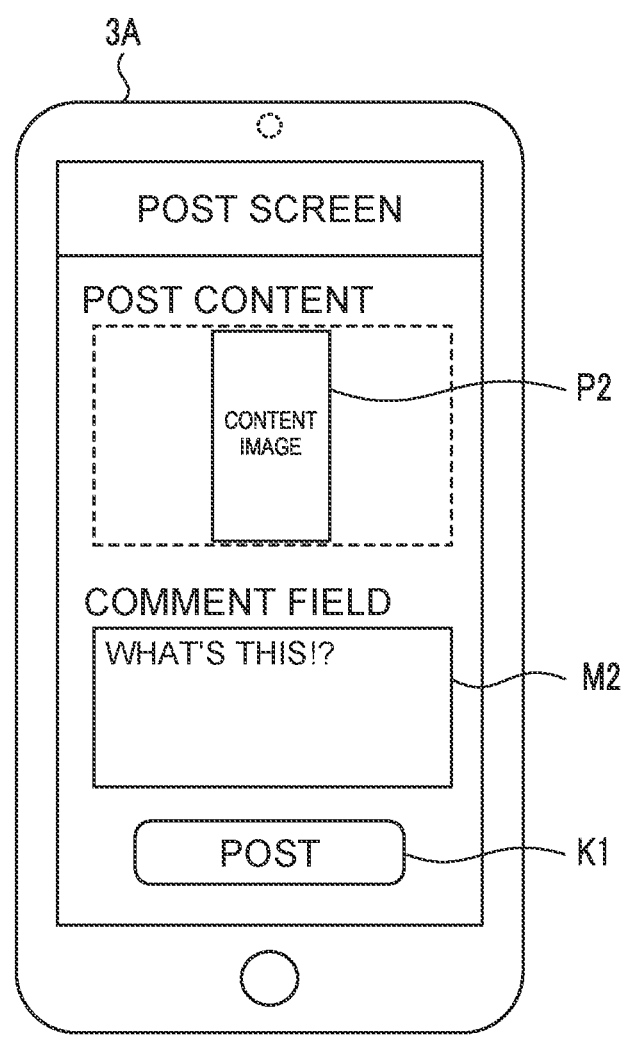
FIG. 8 is a view illustrating an example of a display screen of the user terminal according to the embodiment of the present disclosure.

Also, as another embodiment, the effect measurement device 113 may measure the advertising effect of the content on the basis of the post information D3 (see FIG. 5) of the content that is posted to the SNS (see FIG. 8). For example, the effect measurement device 113 may measure the advertising effect of the content on the basis of the number of posting of the content displayed on the display device 2 by reading the two-dimensional code C on the user terminal 3. The effect measurement device 113 is an example of the effect measurement device according to the present disclosure.

The content administrator can verify the advertising effect of the content by acquiring these measurement results. The administrator can use the measurement results for content selection, play location selection, and creation of the play schedule (the playlist).

Content Delivery Processing

Figure 15:
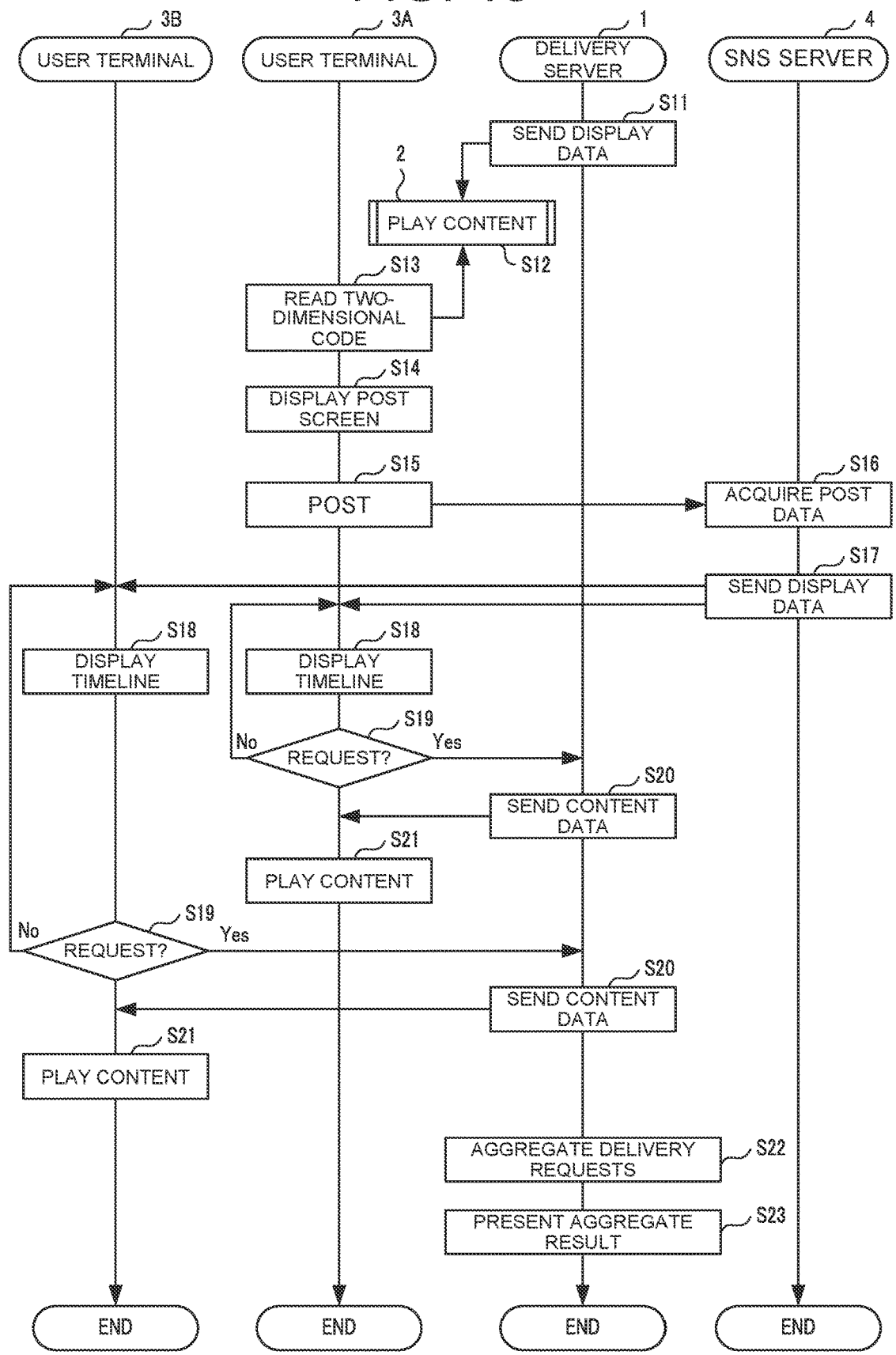
FIG. 15 is a flowchart for explaining an exemplary procedure for content delivery processing that is executed in the content delivery system according to the embodiment of the present disclosure.

A description will hereinafter be made on an exemplary procedure for the content delivery processing that is executed by the content delivery system 100 with reference to FIG. 15.

The present disclosure can be construed as a disclosure of a content delivery method for executing one or plural steps included in the content delivery processing. The one or plural steps included in the content delivery processing, which will be described herein, may appropriately be omitted. The execution order of steps in the content delivery processing may differ to the extent that similar effects are produced. A description will herein be made on a case where the controller 11 in the content delivery server 1, the controller 21 in the display device 2, the controller 31 in the user terminal 3, and the controller 41 in the SNS server 4 execute the steps in the content delivery processing as an example. However, in another embodiment, the plural processors may execute the steps in the content delivery processing in a distributed manner.

First, in step S11, the controller 11 in the content delivery server 1 sends, to the display device 2, the display data that includes the playlist information D1 (see FIG. 3) corresponding to the display device 2 and the content data. For example, the controller 11 sends the display data to the display device 2 in the square 2.

Next, in step S12, when acquiring the display data, the controller 21 of the display device 2 in the square 2 plays the content on the display device 2 on the basis of the playlist information D1. In addition, the controller 21 generates the two-dimensional code C that corresponds to the content to be played, and displays the two-dimensional code C on the display device 2 (see FIG. 6). Step S12 is an example of the code generation step and the content display step according to the present disclosure.

Here, for example, the user A holds up the user terminal 3A to capture an image of the two-dimensional code C2 while the content P2 is played on the display device 2 (see FIG. 7). Then, the controller 31 in the user terminal 3A reads the content ID and the display device ID from the image data of the two-dimensional code C2 (S13). Here, the controller 31 reads the content ID "10000002" and the display device ID "SQUARE 2" from the image data of the two-dimensional code C2. Step S13 is an example of the information reading step according to the present disclosure.

Next, in step S14, the controller 31 causes the user terminal 3A to display the post screen (the web page) illustrated in FIG. 8. When the user A enters the post comment M2 and presses the post button K1 on the post screen, the controller 31 sends, to the SNS server 4, the post data that includes the identification information of the post user (the user ID), the information on the content ID "10000002", the information on the display device ID "SQUARE 2", and the information on the post comment M2 "WHAT'S THIS?" (S15). Step S15 is an example of the posting step according to the present disclosure.

Next, in Step S16, the controller 41 in the SNS server 4 acquires the post data. When acquiring the post data, the controller 41 stores, in the storage 42, the post information D3 (see FIG. 5) that includes the information on the post date and time and the information on the repost level.

Next, in step S17, the controller 41 causes each of the user terminals 3 to display the post information on the basis of the acquired post data. For example, when acquiring the post information posted by the user A, the controller 41 sends the display data corresponding to the post information to the user terminal 3A of the user A and the user terminal 3 of the user (the follower) who is in the same group as the user A.

When acquiring the display data from the SNS server 4, the controller 31 in each of the user terminals 3 displays the post information in the timeline format (S18). The controller 31 in each of the user terminals 3 executes processing in following steps S18 to S21 in parallel.

In step S19, the controller 31 determines whether the controller 31 has accepted, from the user, the delivery request for the content that is displayed in the timeline. For example, if the user B presses the play button for the content P2 in the timeline on the user terminal 3B (see FIG. 10), the controller 31 determines that the delivery request has been accepted. If the controller 31 accepts the delivery request (S19: Yes), the processing proceeds to Step S20. If the controller 31 does not accept the delivery request (S19: No), the processing returns to Step S18.

In step S20, when acquiring the content delivery request, the controller 11 in the content delivery server 1 sends the corresponding content data to the user terminal 3 as the source of the delivery request. In addition, when acquiring the delivery request, the controller 11 stores the log information D2 (see FIG. 4).

In step S21, when acquiring the content data from the content delivery server 1, the controller 31 in the user terminal 3 plays the content on the operation display 33 of the own terminal.

In step S22, the controller 11 in the content delivery server 1 aggregates the content delivery request. More specifically, in the case where the content posted by the user is displayed in the timeline on each of the user terminals 3, and where the user makes the delivery request for the content in the timeline, the controller 11 aggregates the number of the delivery requests (the number of plays). In addition, for example, in the case where the content corresponding to the delivery request is played and the user further reposts such a content, the controller 11 aggregates the number of plays of the reposted content. Step S22 is an example of the effect measurement step according to the present disclosure.

In step S23, the controller 11 presents the aggregate result to the content administrator, for example. The controller 11 may cause the operation display 13 of the content delivery server 1 to display the aggregate result (see FIG. 11 to FIG. 14), or may send data on the aggregation result to an administrator terminal (not illustrated). In the manner that has been described so far, the content delivery system 100 executes the content delivery processing.

As it has been described so far, the content delivery system 100 according to the present embodiment is a content delivery system that plays the content on the display device 2 installed at the predetermined location according to the predetermined play schedule. The content delivery system 100 generates the information code (the two-dimensional code) that associates the identification information of the content with the identification information of the display device 2 playing the content, and causes the display device 2 to display the content and the information code. In addition, the content delivery system 100 reads the identification information of the content and the identification information of the display device 2 from the information code displayed on the display device 2, and posts, to the SNS server 4, the post data including the identification information of the content and the identification information of the display device 2 that have been read. Furthermore, the content delivery system 100 then measures the effect of the content on the basis of the information on the post data.

With the above configuration, for example, when the content is played on the display device 2 in the square 2, the user uses the user terminal to read the two-dimensional code that is displayed on the display device 2 by the user terminal 2. In this way, the user can post the content to the SNS. The content that has been posted to the SNS is displayed on the user terminal 3 of the post user and the user terminal 3 of the follower of the post user. The user can play the content on the own user terminal 3 by making the delivery request for the content displayed on the user terminal 3. In this way, the post user can spread the content. The content delivery system 100 can measure the advertising effect of the content on the basis of the number of posts of the content, the delivery requests, and the like. Therefore, it is possible to improve measurement accuracy of the advertising effect of the content that is displayed on the display device 2.

Here, the content delivery system 100 may generate the content and the playlist on the basis of the measured advertising effect. For example, the controller 11 in the content delivery server 1 generates the content to be played on the display device 2 in each of the squares and the play schedule on the basis of the aggregate information D4 illustrated in FIG. 11, the aggregate information D5 illustrated in FIG. 12, and the like. Alternatively, for example, the controller 11 generates the content to be played on the display device 2 in each of the squares on the basis of the graphs of the aggregate result illustrated in FIG. 13 and FIG. 14.

The controller 11 may perform machine learning by using learning data that includes at least any of the number of posts of the content, the repost level (the number of reposts), the number of delivery requests (the number of plays), the number of followers of the post user, and evaluation values of the post comments, and may generate the content to be played on the display device 2 and the play schedule.

More specifically, the controller 11 performs the machine learning by using the learning data and thereby generates a learned model. For example, the controller 11 generates the learned model for estimating the play schedule that corresponds to the specified content. In addition, for example, the controller 11 generates the learned model for estimating the content that includes an optimal feature corresponding to the specified content.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A content delivery method for playing a content on a display device, the content being installed at a predetermined location in a predetermined play schedule, the content delivery method comprising:

generating an information code that associates identification information of the content with identification information of the display device playing the content;

displaying, on the display device, the content and the information code;

reading the identification information of the content and the identification information of the display device from the information code displayed on the display device;

posting, to a message management server, post data including the identification information of the content and the identification information of the display device that have been read;

measuring an effect of the content on a basis of information on the post data;

causing a first user terminal to display the content on a basis of the post data posted to the message management server;

sending a content delivery request to a content delivery server when accepting, from a first user, the content delivery request on the first user terminal that displays the content;

causing the first user terminal of the first user who has posted the post data to the message management server and a second user terminal of a second user who is in the same group as the first user to display the content;

measuring the effect of the content further on a basis of a number of content delivery requests, including the content delivery request;

when acquiring content data of the content that is sent from the content delivery server in response to the content delivery request, playing the content on the second user terminal;

when accepting, from the second user, an operation to repost the content that has been played on the second user terminal, reposting, to the message management server, the post data including the identification information of the content and the identification information of the display device; and when the content corresponding to the content delivery request is played and the content is reposted by the second user who has played the content, counting the number of content delivery requests, including the content delivery request, for the reposted content.

2. A content delivery system that plays a content on a display device, the content being installed at a predetermined location in a predetermined play schedule, the content delivery system comprising:

a controller including three or more processors and at least one memory, the at least one memory storing one or more instructions that, when executed by the three or more processors, cause the content delivery system to:

generate an information code associating identification information of the content with identification information of the display device playing the content;

cause the display device to display the content and the information code;

read the identification information of the content and the identification information of the display device from the information code displayed on the display device;

post, to a message management server, post data including the identification information of the content and the identification information of the display device that have been read;

measure an effect of the content on a basis of information on the post data;

cause a first user terminal to display the content on a basis of the post data posted to the message management server;

send a content delivery request to a content delivery server when accepting, from a first user, the content delivery request on the first user terminal that displays the content;

cause the first user terminal of the first user who has posted the post data to the message management server and a second user terminal of a second user who is in the same group as the first user to display the content;

measure the effect of the content further on a basis of a number of content delivery requests, including the content delivery request;

when acquiring content data of the content that is sent from the content delivery server in response to the content delivery request, play the content on the second user terminal;

when accepting, from the second user, an operation to repost the content that has been played on the second user terminal, repost, to the message management server, the post data including the identification information of the content and the identification information of the display device; and when the content corresponding to the content delivery request is played and the content is reposted by the second user who has played the content, count the number of content delivery requests, including the content delivery request, for the reposted content.

3. The content delivery system according to claim 2, wherein the one or more instructions, when executed by the three or more processors, further cause the content delivery system to cause the first user terminal to display a post screen, and post, to the message management server, the post data including a post comment entered on the post screen.

4. The content delivery system according to claim 3, wherein the one or more instructions, when executed by the three or more processors, further cause the content delivery system to measure the effect of the content further on a basis of a content of the post comment.

5. A non-transitory computer-readable recording medium that records a content delivery program, the content delivery program including instructions that play multiple contents on a display device, the multiple contents being installed at a predetermined location in a predetermined play schedule, the instructions, when executed by three or more processors, causing the three or more processors to:

generate an information code that associates identification information of the content with identification information of the display device playing the content;

cause the display device to display the content and the information code;

read the identification information of the content and the identification information of the display device from the information code displayed on the display device;

post, to a message management server, post data including the identification information of the content and the identification information of the display device that have been read;

measure an effect of the content on a basis of information on the post data;

cause a first user terminal to display the content on a basis of the post data posted to the message management server;

send a content delivery request to a content delivery server when accepting, from a first user, the content delivery request on the first user terminal that displays the content;

cause the first user terminal of the first user who has posted the post data to the message management server and a second user terminal of a second user who is in the same group as the first user to display the content;

measure the effect of the content further on a basis of a number of content delivery requests, including the content delivery request;

when acquiring content data of the content that is sent from the content delivery server in response to the content delivery request, play the content on the second user terminal;

when accepting, from the second user, an operation to repost the content that has been played on the second user terminal, repost, to the message management server, the post data including the identification information of the content and the identification information of the display device; and when the content corresponding to the content delivery request is played and the content is reposted by the second user who has played the content, count the number of content delivery requests, including the content delivery request, for the reposted content.

\* \* \* \* \*